US011403783B2

(12) United States Patent
Xu et al.

(10) Patent No.: US 11,403,783 B2
(45) Date of Patent: Aug. 2, 2022

(54) TECHNIQUES TO DYNAMICALLY GATE ENCODED IMAGE COMPONENTS FOR ARTIFICIAL INTELLIGENCE TASKS

(71) Applicant: Alibaba Group Holding Limited, Grand Cayman (KY)

(72) Inventors: Kai Xu, Hangzhou (CN); Minghai Qin, Hongzhou (CN); Yuhao Wang, Hangzhou (CN); Fei Sun, Hangzhou (CN); Yen-kuang Chen, Hangzhou (CN); Yuan Xie, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 117 days.

(21) Appl. No.: 16/684,412

(22) Filed: Nov. 14, 2019

(65) Prior Publication Data
US 2021/0150768 A1 May 20, 2021

(51) Int. Cl.
*G06T 9/00* (2006.01)
*G06T 7/90* (2017.01)

(52) U.S. Cl.
CPC ............ *G06T 9/002* (2013.01); *G06T 7/90* (2017.01); *G06T 2207/10024* (2013.01); *G06T 2207/20052* (2013.01); *G06T 2207/20064* (2013.01); *G06T 2207/20081* (2013.01)

(58) Field of Classification Search
CPC . G06T 9/002; G06T 7/90; G06T 2207/20081; G06T 2207/20064; G06T 2207/10024; G06T 2207/20052
USPC .......................................................... 382/156
See application file for complete search history.

(56) References Cited

U.S. PATENT DOCUMENTS

| 5,559,557 A | 9/1996 | Kato |
| 5,629,736 A | 5/1997 | Haskell et al. |
| 5,864,637 A | 1/1999 | Liu et al. |
| 6,141,059 A | 10/2000 | Boyce et al. |
| 7,209,594 B1 | 4/2007 | Martucci et al. |

(Continued)

FOREIGN PATENT DOCUMENTS

WO 2019110124 6/2019

OTHER PUBLICATIONS

Image and Video Compression Coding Theory, https://www.tcs.ifi.lmu.de/teaching/ws-2016-17/code/background-image-video-compression, 96 pages.

(Continued)

*Primary Examiner* — Ali Bayat

(57) ABSTRACT

A system for processing encoded image components for artificial intelligence tasks. The system can include one or more compute units, one or more controllers and memory. The one or more controllers can include one or more micro-op schedulers and one or more channel switches. The one or more compute units can be configured to process components of the transformed domain image data according to one or more micro-operations for an artificial intelligence task. The one or more channel switches can be configured to selectively control the transfer of the components of transformed domain image data to the one or more compute units based on one or more gating flags. The one or more channel switches can also be configured to selectively control generation of the one or more micro-operations by the one or more micro-op schedulers based on the one or more gating flags.

18 Claims, 11 Drawing Sheets

(56) References Cited

U.S. PATENT DOCUMENTS

| | | | |
|---|---|---|---|
| 7,545,988 | B2 | 6/2009 | Meeker |
| 8,660,355 | B2 | 2/2014 | Rodriguez et al. |
| 9,794,540 | B2* | 10/2017 | Barron .................. G06T 5/20 |
| 2004/0252758 | A1 | 12/2004 | Katsavounidis et al. |
| 2006/0013303 | A1 | 1/2006 | Nguyen |
| 2008/0260276 | A1 | 10/2008 | Yamatani et al. |
| 2010/0014584 | A1 | 1/2010 | Feder et al. |
| 2012/0044990 | A1 | 2/2012 | Bivolarsky |
| 2012/0170838 | A1* | 7/2012 | Wang .................. G06K 9/00744 382/165 |
| 2014/0010284 | A1 | 1/2014 | Hong |
| 2014/0036997 | A1 | 2/2014 | Lee |
| 2014/0362905 | A1 | 12/2014 | Nguyen |
| 2016/0259960 | A1 | 9/2016 | Derakhshani et al. |
| 2016/0269733 | A1 | 9/2016 | Tourapis et al. |
| 2017/0053398 | A1* | 2/2017 | Mahoor .................. G06K 9/6269 |
| 2017/0132496 | A1 | 5/2017 | Shoaib et al. |
| 2017/0339430 | A1 | 11/2017 | Kalevo |
| 2018/0293713 | A1 | 10/2018 | Vogels et al. |
| 2018/0293777 | A1 | 10/2018 | Sarel et al. |
| 2019/0007685 | A1 | 1/2019 | Lievens et al. |
| 2019/0034716 | A1 | 1/2019 | Kamarol et al. |
| 2019/0244394 | A1 | 8/2019 | Gueguen et al. |
| 2019/0347847 | A1 | 11/2019 | Elgharib et al. |
| 2020/0051225 | A1* | 2/2020 | Barron .................. G06T 5/40 |
| 2020/0055614 | A1* | 2/2020 | Somanath .................. C22C 14/00 |
| 2020/0351509 | A1* | 11/2020 | Lee .................. G06N 3/0454 |
| 2021/0035331 | A1* | 2/2021 | Xie .................. H04N 1/64 |

OTHER PUBLICATIONS

Gowda, Shreyank et al., Color Net: Investigating the Importance of Color Spaces for Image Classification, arXiv; 1902.00267v1 [cs.CV] Feb. 1, 2019, 17 pages.

Gueguen, Lionel, Faster Neural Networks Straight from JPEG, 32nd Conference on Neural Information Processing Systems (NeurIPS 2018), Montreal, Canada, 12 pages.

Ulicny, Matej; et al. On Using CNN with DCT based Image Data Journal. 8 pages. Aug. 30-Sep. 1, 2017. Maynooth, Ireland. ISBN 978-0-9934207-0-6.

Jiang, Jianmin; et al. The Spatial Relationship of DCT Coefficients Between a Block and Its Sub-Blocks. Journal. 10 pages. IEEE Transactions on Signal Processing, vol. 50, No. 5, May 2002.

Wang, Yunhe; et al. CNNpack: Packing Convolutinal Neural Networks in the Frequency Domain. Journal. 9 pages. 30th Conference on Neural Information Processing Systems (NIPS 2016), Barcelona, Spain.

Tan, Kelvin Sim Zhen; et al. Classification of Compressed Domain Images Utilizing Open VINO Interference Engine. Journal. 10 pages. International Journal of Engineering and Advanced Technology (IJEAT) ISSN: 2249-8958, vol. 9, Issue-1, Oct. 2019.

Storkey, Amos; et al. Cosine Transform Priors for Enhanced Decoding of Compressed Images.Journal. 6 pages. School of Informatics, University of Edinburgh. 5 Forrest Hill, Edinburgh, EH1 2QL.

Verma, Vinay; et al. DCT-domain Deep Convolutional Neural Networks for Multiple JPEG Compression Classification. Journal. 12 pages. Multimedia Analysis and Security (MANAS) Lab, Electrical Engineering, Indian Institute of Technology Gandhinagar (IITGN), Gujarat, India. arXiv:1712.02313v1 [cs.MM] Dec. 6, 2017.

Ehrlich Max; et al. Deep Residual Learning in the JPEG Transform Domain; Journal. 10 pages. University of Maryland, College Park, MD, USA.

Bodnar, Peter; et al. Localization of Visual Codes in the DCT Domain Using Deep Rectifier Neural Networks. Journal; 8 pages. University of Szeged, Department of Image Processing and Computer Graphics, Szeged,Hungary. ISBN: 978-989-758-041-3 Copyright 2014 SCITEPRESS(ScienceandTechnologyPublications, Lda.).

* cited by examiner

TECHNIQUES TO DYNAMICALLY GATE ENCODED IMAGE COMPONENTS FOR ARTIFICIAL INTELLIGENCE TASKS

RELATED APPLICATIONS

This application is related to U.S. patent application Ser. No. 16/684,363, Filed Nov. 14, 2019, and entitled "Techniques for Determining Importance of Encoded Image Components for Artificial Intelligence Tasks," U.S. patent application Ser. No. 16/684,294, filed Nov. 14, 2019, and entitled "Reconstructing Transformed Domain Information in Encoded Video Streams," and U.S. patent application Ser. No. 16/684,305, filed Nov. 14, 2019, and entitled "Using Selected Frequency Domain Components of image Data in Artificial Intelligence Tasks," all of which are incorporated herein in their entirety.

BACKGROUND OF THE INVENTION

Artificial intelligence (AI), machine learning, and deep learning are utilized for various image processing tasks, computer vision tasks, and the like. Artificial intelligence as used herein refers to techniques that enable devices to mimic human intelligence, using logic, if-then rules, decision trees, and the like. Machine learning includes a subset of artificial intelligence that includes abstruse statistical techniques that enable machines to improve at task with experience. Deep learning includes a subset of machine learning that includes algorithms that permit software to train itself to perform tasks by exposing multilayered artificial neural networks, recurrent neural networks (RNN), convolution neural networks (CNN) or the like to vast amounts of data. For ease of explanation artificial intelligence, as used herein, also includes machine learning, deep learning and the like. Furthermore, as used herein the term images refers to pictures and video.

Referring to FIG. 1, a method of image capture and processing for use in artificial intelligence tasks, according to the convention art, is shown. Images are generally captured in a given format, such as frames of Red, Green and Blue (RGB) pixel data, referred to herein as the native format 110. The native format can comprise a relatively large amount of data that consumes a relatively large amount of communication bandwidth and or a relatively large amount of memory space to transfer and or store the image data in the native format. Therefore, the native format image data is typically converted to a transformed domain data format 120. For example, RGB pixel data can be converted into YCbCr discrete cosine transform (DCT) encoded components for transmission and storage. The transformed domain image data can then be transmitted and or stored 130 for subsequent processing by artificial intelligence tasks. Artificial intelligence tasks, however, typically process image data in a native format such as RGB pixel data. Therefore, the transformed domain data format is typically converted back to the native data format 140, before processing in artificial intelligence tasks 150.

Referring now to FIG. 2, an exemplary method of converting native format image data to transformed domain image data 120 according to the conventional art is shown. As illustrated, a frame of RGB image data 210 can include an array of red pixel values 212, an array of green pixel values 214 and an array of blue pixel values 216. Each value can be represented by eight bits. For example, frames of pixel data in the Red, Green and Blue (RGB) color space 210 can be converted 220 into frames of image data in the YCbCr luma-chroma color space 230. The frame of YCbCr image data 230 can include a luma component 232, a blue-difference chroma component 234 and a red-difference chroma component 236. The frames of YCbCr image data 230 can be domain transformed 240 utilizing a Discrete Cosine Transform (DCT) into components of discrete cosine transformed YCbCr image data 250. The discrete cosine transformed YCbCr image data 250 can include a discrete cosine transformed luma component 252, a discrete cosine transformed blue-difference chroma component 254, and a discrete cosine transformed red-difference chroma component 256. The above exemplary method of converting native format image data to transformed domain image data is merely for illustrative purposes. It is to be appreciated that there are other color spaces and or other transformed domains that can be applied.

Referring now to FIG. 3, an exemplary method of converting transformed domain image data to native format image data 140 according to the conventional art is shown. For example, discrete cosine transformed YCbCr image data 310 can be inverse domain transformed 320 into frames YCbCr image data 330. The frames YCbCr image data 330 can be converted 340 into frames of RGB image data 350.

Image capture in a native data format, conversion of the native formatted image data to a transformed domain format for transmission and storage, and then conversion back to the native format for processing in artificial intelligence tasks can also consume large amount of communication and processing resources. The increased communication and processing load can result in increased processing latency and or increased power consumption. Therefore, there is a continuing need for improved image capture and processing by Artificial Intelligence, machine learning, or deep learning tasks.

SUMMARY OF THE INVENTION

The present technology may best be understood by referring to the following description and accompanying drawings that are used to illustrate embodiments of the present technology directed toward techniques to dynamically gate encoded image components utilized in Artificial Intelligence (AI) tasks.

In one embodiment, a method of computing an artificial intelligence task can include receiving components of transformed domain image data. The components of transformed domain image data can be processed in accordance with an artificial intelligence task based on one or more gating flags. In one implementation, the one or more gating flags can be based on available computations resources. In another implementation, the one or more gating flags can be based on the importance of the components of transformed domain image data. In yet another implementation, the one or more gating flags can be based on the combination of the importance of the components of transformed domain image data and the computations resources available for processing the components of transformed domain image data.

In another embodiment, one or more computing device executable instructions stored in one or computing device readable media (e.g., memory) that when executed by one or more compute unit (e.g., processors) can perform a method of computing an artificial intelligence task. The method can include receiving components of transformed domain image data. The components of transformed domain image data can be processed based on one or more gating flags. The one or more gating flags can be based on one or more indications of an importance of the components of transformed domain image data, one or more indications of computations resources available, or similar factors, and combinations thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
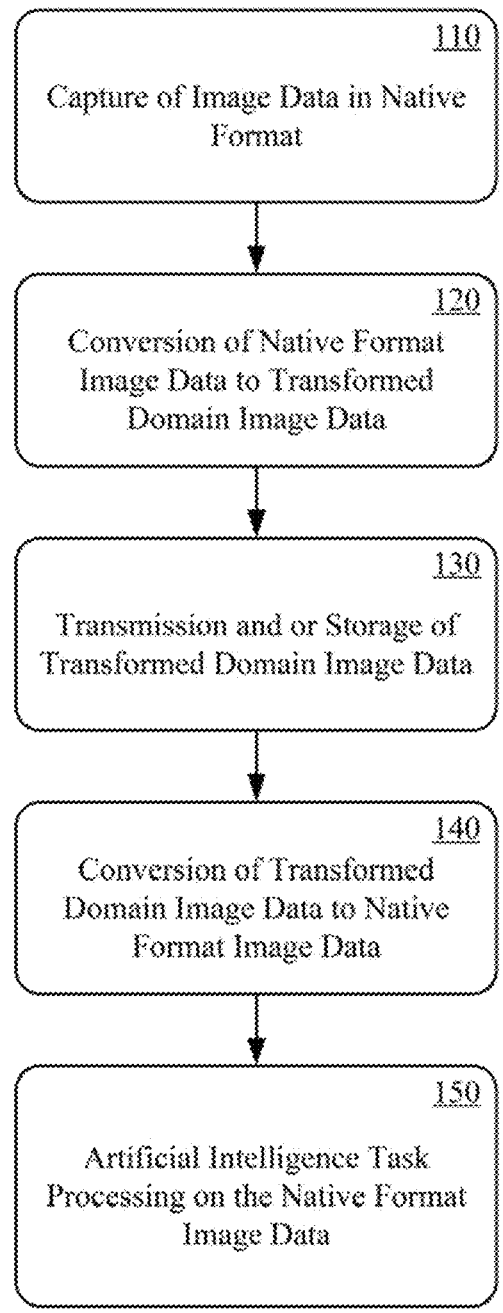
FIG. 1 shows a method of image capture and processing for use in artificial intelligence tasks, according to the convention art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Figure 4:
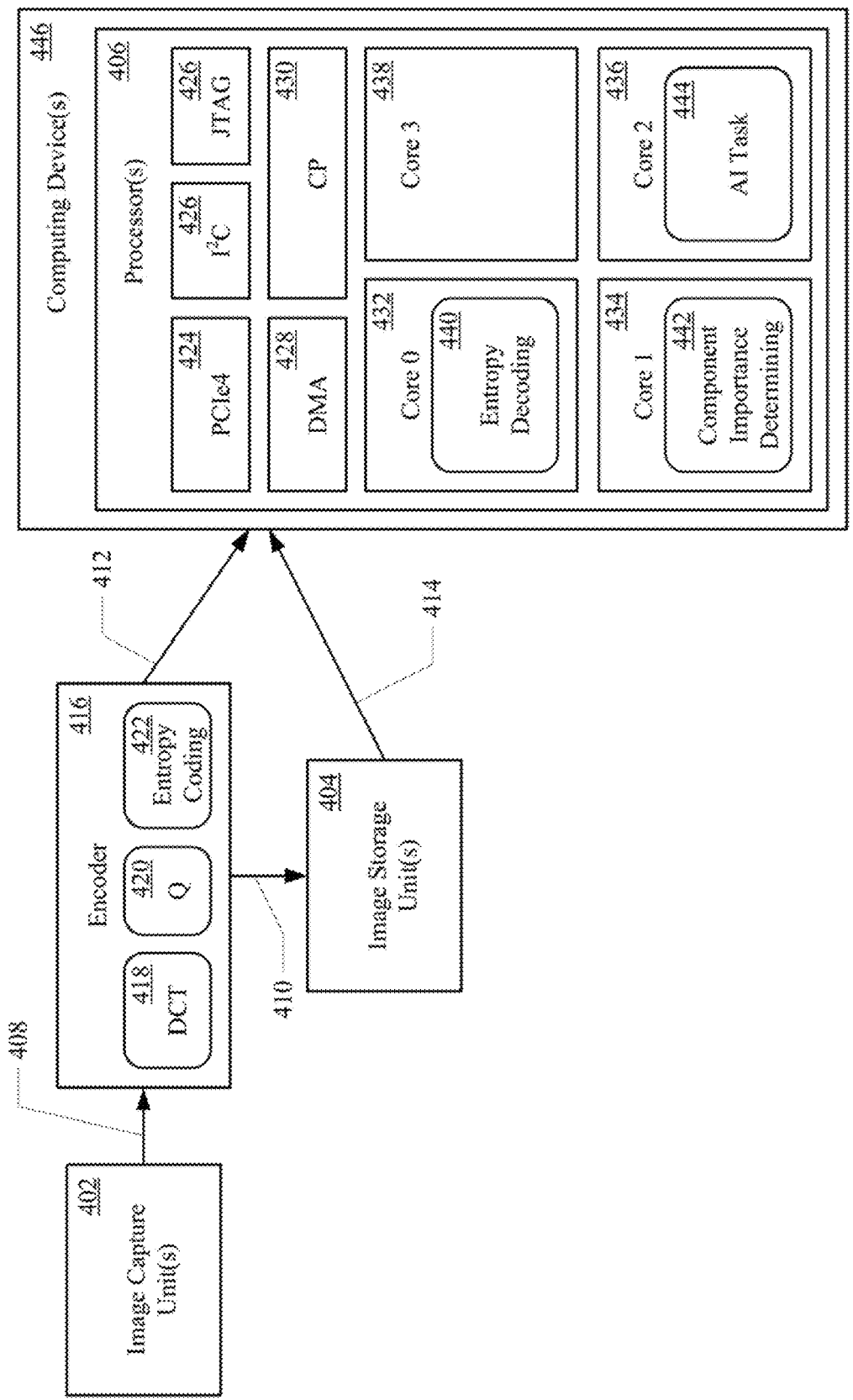
FIG. 4 shows a system for determining importance of encoded image components for artificial intelligence tasks, in accordance with aspects of the present technology.

Referring now to FIG. 4, a system for determining importance of encoded image components for Artificial Intelligence (AI) tasks, in accordance with aspects of the present technology, is shown. The system can include one or more image capture units 402 or image storage units 404 and one or more processors 406 communicatively coupled by one or more communication interfaces 408-414. The one or more communication interfaces 408-414 can include one or more wired network communication links, one or more wireless network communication links, one or more data buses, or the like, or combinations thereof.

In one implementation, the one or more image capture units 402 can be a camera, video camera or the like for generating one or more frames of image data in a native format. The one or more image storage units 404 can be a hard disk drive (HDD), solid state storage device (SSD), random access memory (RAM), flash memory, network attached storage (NAS), or the like, or combinations thereof, for storing the components of transformed domain image data. The one or more image capture units 402 and or one or more image storage units 404 can include encoder circuitry 416 to convert the image data in the native format to components of transformed domain image data. Alternatively or in addition, the encoder circuitry 416 can be separate from the one or more capture units 402 and or the one or more image storage units 404. In one implementation, the encoder circuitry 416 can include a discrete cosine transform engine 418, a quantization engine 420 and an entropy coding engine 422. The discrete cosine transform engine 418, quantization engine 420 and entropy coding engine 422 can be configured to convert native format image data to a transformed domain data format. A detailed understanding of the discrete cosine transform engine 418, the quantization engine 420 and the entropy coding engine 422 are not necessary for an understanding of aspects of the present technology and therefore will not be discussed further herein.

The one or more processors 406 can include one or more central processing units (CPUs), one or more cores of one or more central processing units (CPUs), one or more graphics processing units (GPUs), one or more cores of one or more graphics processing units (GPUs), one or more neural processing units (NPUs), one or more cores of one or more neural processing units (NPUs), one or more vector processors, one or more memory processing units, or the like, or combinations thereof. In one implementation, the one or more processors 406 can be one or more neural processing units. An neural processing unit can include one or more communication interfaces, such as peripheral component interface (PCIe4) 424 and inter-integrated circuit ($I^2C$) interface 426, an on-chip circuit tester, such as a joint test action group (JTAG) engine, a direct memory access engine 428, a command processor (CP) 430, and one or more cores 432-438. The one or more cores 432-438 can be coupled in a single-direction ring bus configuration. The one or more cores 432-438 can execute one or more sets of computing device executable instructions to perform one or more functions, such as entropy decoding 440, component importance determining 442, artificial intelligence tasks 444 and or the like. One or more functions can be performed an individual core 432-438, can distributed across a plurality of cores 432-428, can be performed along with one or more other functions on one or more cores, and or the like.

In one implementation, the one or more processors 406 can be implemented in one or more computing devices 446. The one or more computing devices 446 can be, but are not limited to, cloud computing platforms, edge computing devices, servers, workstations, personal computers (PCs).

Figure 5:
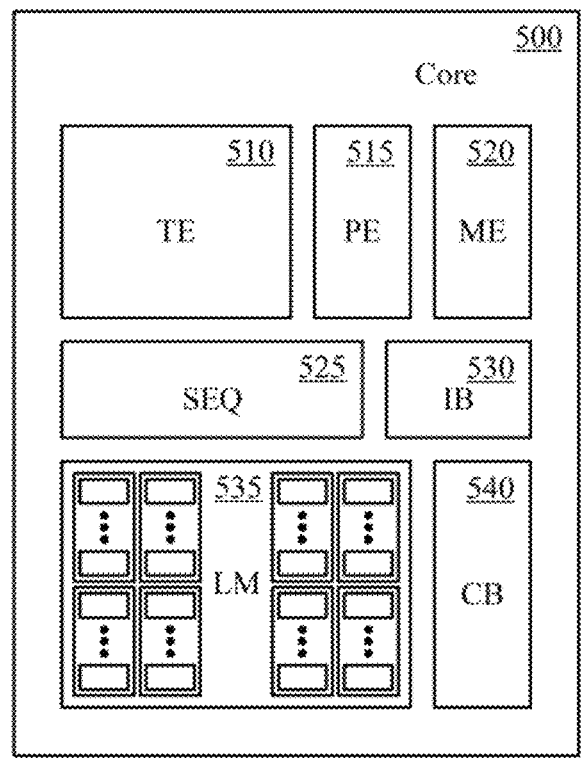
FIG. 5 shows an exemplary processor core, in accordance with aspects of the present technology.

Referring now to FIG. 5, an exemplary processor core, in accordance with aspects of the present technology, is shown. In one implementation, the processing core 500 can be a neural processing unit core The processing core 500 can include a tensor engine (TE) 510, a pooling engine (PE) 515, a memory copy engine (ME) 520, a sequencer (SEQ) 525, an instructions buffer (IB) 530, a local memory (LM) 535, and a constant buffer (CB) 540. The local memory 535 can be pre-installed with model weights and can store in-use activations on-the-fly. The constant buffer 540 can store constant for batch normalization, quantization and the like. The tensor engine 510 can be utilized to accelerate fused convolution and or matrix multiplication. The pooling engine 515 can support pooling, interpolation, region-of-interest and the like operations. The memory copy engine 520 can be configured for inter- and or intra-core data copy, matrix transposition and the like. The tensor engine 510, pooling engine 515 and memory copy engine 520 can run in parallel. The sequencer 525 can orchestrate the operation of the tensor engine 510, the pooling engine 515, the memory copy engine 520, the local memory 535, and the constant buffer 540 according to instructions from the instruction buffer 530. The neural processing unit core 500 can provide convolution efficient computation under the control of operation fused coarse grained instructions for functions such as component importance determining 442, artificial intelligence tasks 444 and or the like. A detailed description of the exemplary neural processing unit core 500 is not necessary to an understanding of aspects of the present technology, and therefore will not be described further herein.

Figure 2:
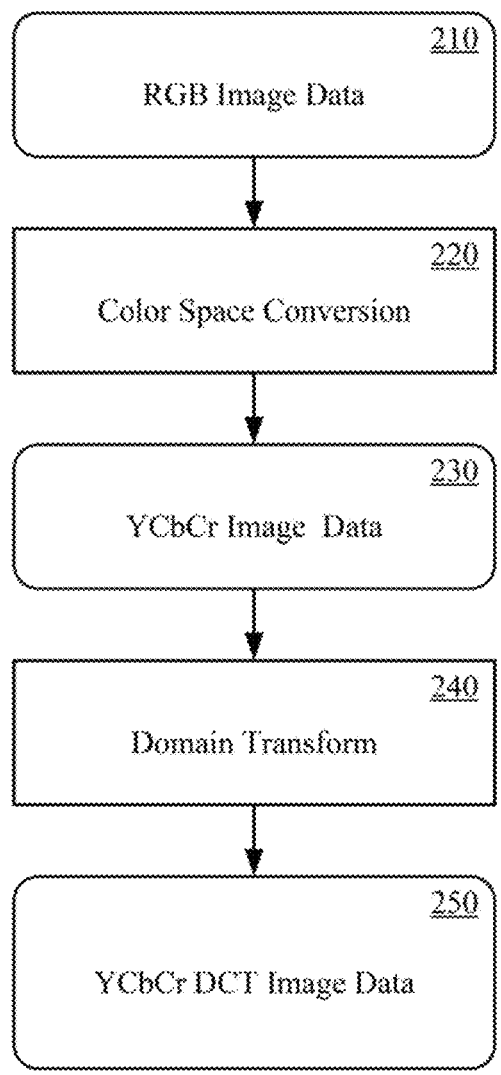
FIG. 2 shows an exemplary method of converting native format image data to transformed domain image data according to the conventional art.
Figure 2:
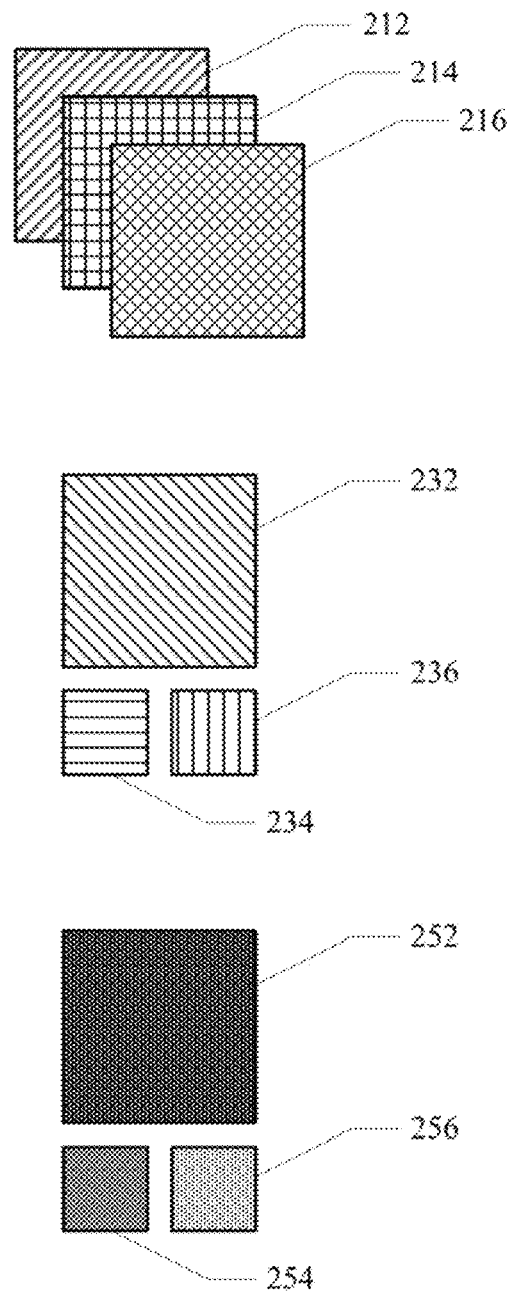
Figure 3:
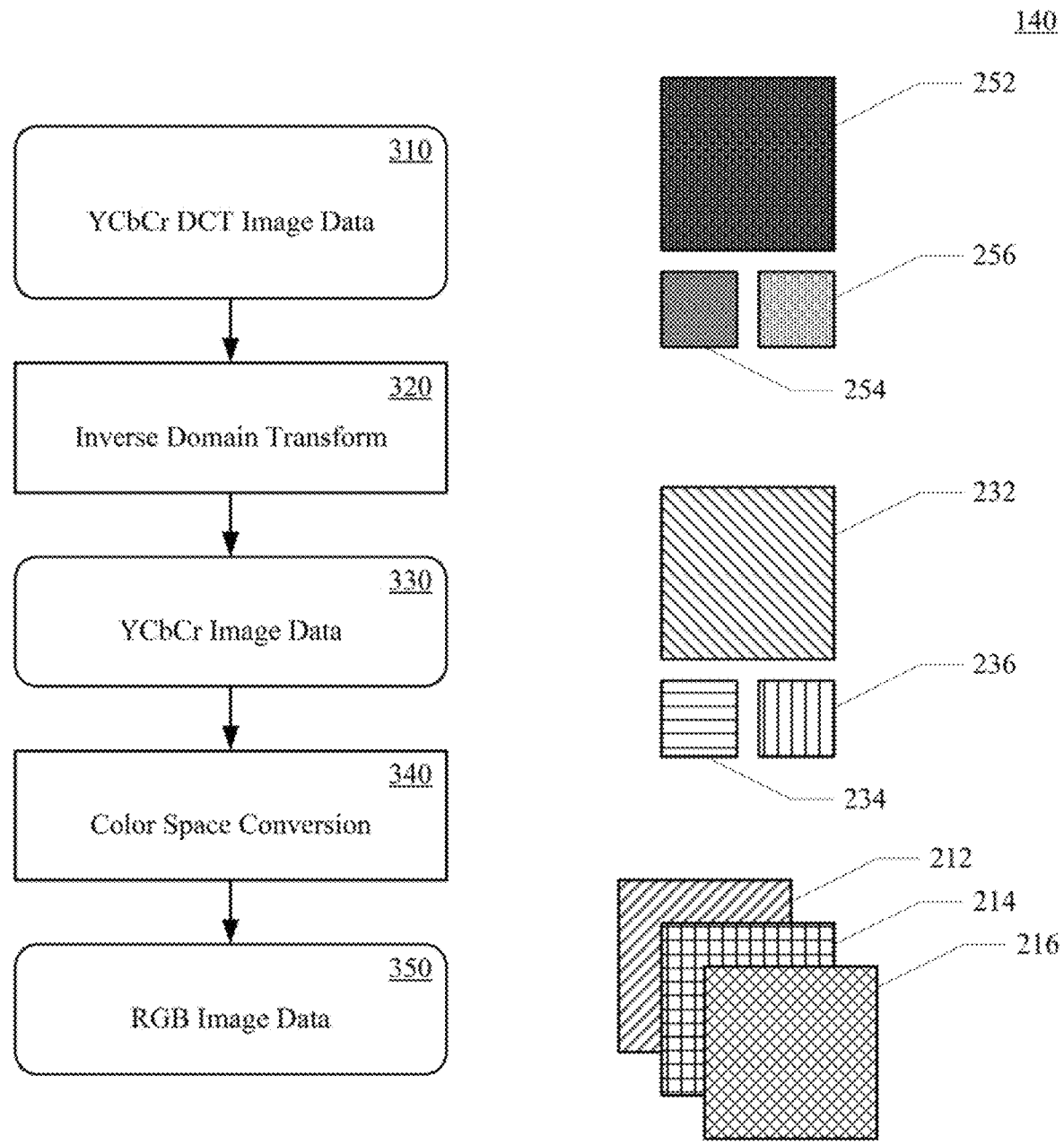
FIG. 3 shows an exemplary method of converting transformed domain image data to native format image data according to the conventional art.
Figure 6:
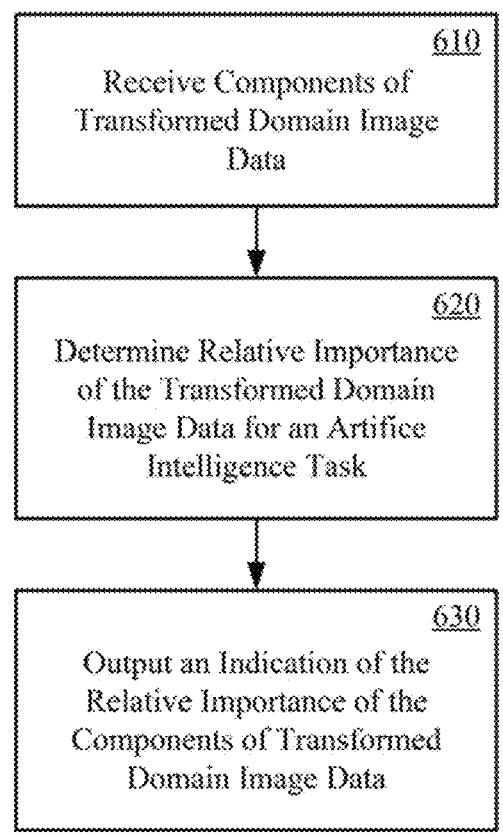
FIG. 6 shows a method of determining importance of encoded imaged components for artificial intelligence tasks, in accordance with aspects of the present technology.

The system for determining the importance of encoded image components for artificial intelligence task will be further explained with reference to FIG. 6, along with FIG. 4 as described above. FIG. 6 shows a method of determining the importance of encoded imaged components. The method may be implemented as computing device-executable instructions (e.g., computer program) that are stored in computing device-readable media (e.g., computer memory) and executed by a computing device (e.g., processor). The method can include receiving components of transformed domain image data, at 610. The components of transformed domain image data can be received by the one or more processors 406 from the one or more image capture units 402 or one or more storage units 404 across the one or more communication interfaces 408-414. In one implementation, the components of transformed domain image data can be one or more frames of Discrete Cosine Transform (DCT) YCbCr image data components. In other implementations, the component of transformed domain image data can be components of frequency domain image data, components of Fourier Transform (FT) image data, components of Wavelet Transform image data, components of Discrete Wavelet Transform (DWT) image data, components of Hadamard transform image data, or components of Walsh transform image data, or the like. In one implementation, the received components of transformed domain image data can be generated from native format image data as described above with reference to FIG. 2.

At 620, the relative importance of the components of transformed domain image data can be determined by a component importance determining function 442 on the one or more processors 406 for a given artificial intelligence tasks. As previously stated, the use of the term Artificial Intelligence herein is intended to also includes machine learning, deep learning and the like. In one implementation, determining the relative importance of the components of the transformed domain image data can include gating the components of the transformed domain image data to turn on select ones of the components of the transformed domain image data for input to a Deep Neural Network (DNN) to determine the relative importance of the component of the transformed domain image data. In another implementation, determining the relative importance of the components of the transformed domain image data can include gating the components of the transformed domain image data based on a cost function to control select ones of the components of the transformed domain image data for input to a Deep Neural Network (DNN) to determine the relative importance of the component of the transformed domain image data. For example, the cost function can include a first term based on an error between a prediction and a target value, and a second term based on the number of active channels in accordance with Equation 1:

$$\text{Cost} = \text{Loss(prediction, target)} + \lambda \# \text{Proportion(active-channels)} \quad (1)$$

In yet another implementation, determining the relative importance of the components of the transformed domain image data can include gating the components of the transformed domain image data in which more important components is more likely to be turned on than less important components for input to a Deep Neural Network (DNN) to determine the relative importance of the component of the transformed domain image data.

At 630, an indication of the relative importance of the components of the transformed domain image data can be output. In one implementation, the indication of the relative importance of the components of the transformed domain image data can be provided to the given artificial intelligence task for use in performing the artificial intelligence task on the components of the transformed domain image data.

Figure 7:
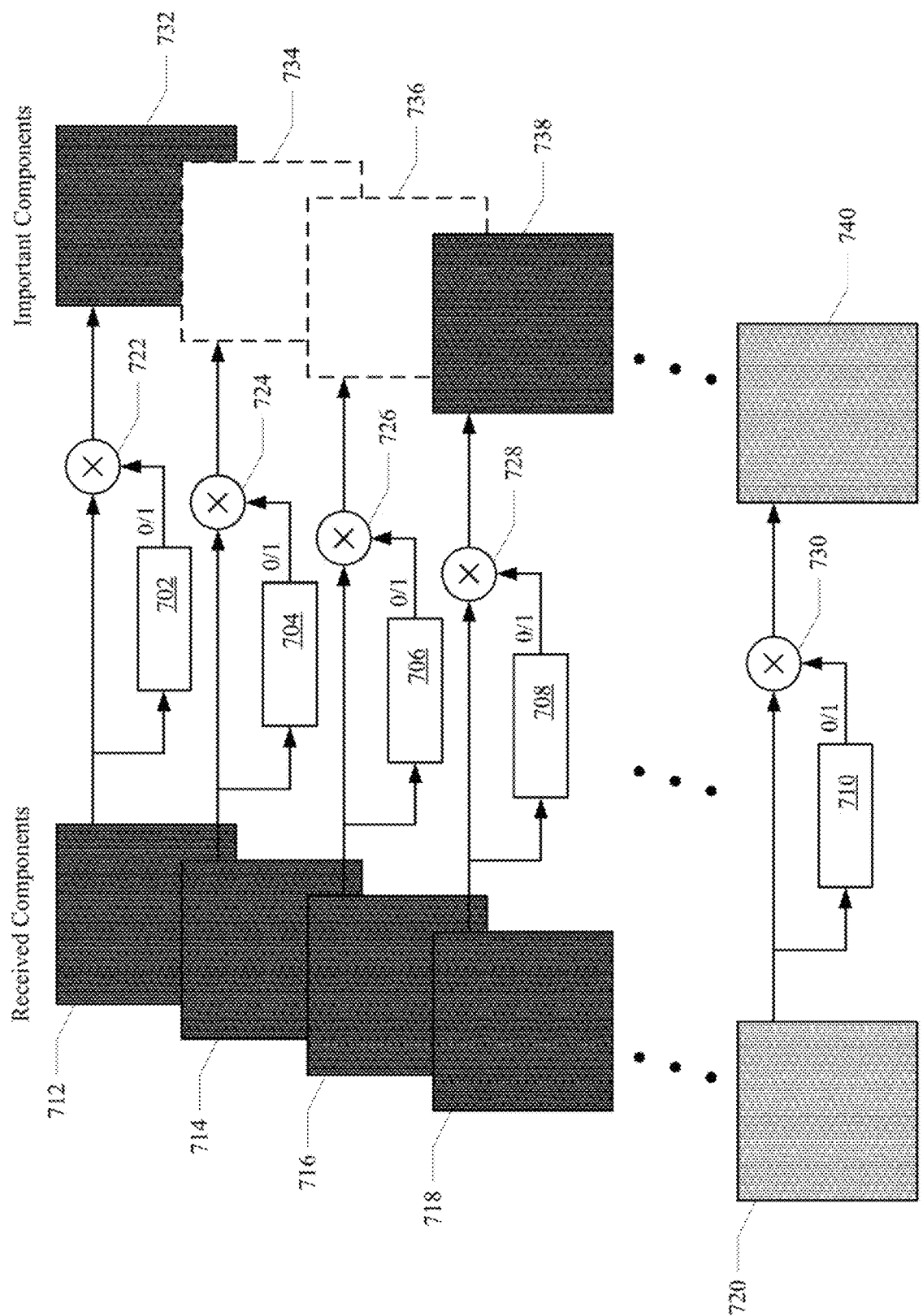
FIG. 7 shows a system for determining importance of encoded image components for artificial intelligence tasks, in accordance with aspects of the present technology.

Referring now to FIG. 7, a system for determining importance of encoded image components for artificial intelligence tasks, in accordance with aspects of the present technology, is shown. The system comprises a plurality of neural networks 702-710 configured to receive a corresponding ones of a plurality of transformed domain image data components 712-720. In one implementation, the transformed domain image data components can include 64 discrete cosine transformed luma Y components, 64 discrete cosine transformed blue-difference chroma Cb components, and 64 discrete cosine transformed blue-difference chroma Cr components.

The plurality of neural networks 702-710 can be configured to predict if the corresponding one of the plurality of transformed domain image data components 712-720 comprises an important component for an artificial intelligence task. If the transformed domain image data component is an important component, the corresponding neural network can generate a first indication. If the transformed domain data component is not an important component, the corresponding neural network can generate a second indication. In one implementation, the respective neural networks generate an indication of '1' when the corresponding transformed domain data component is important, and an indication of '0" when the corresponding transformed domain data component is not important for a given artificial intelligence task.

The plurality of transformed domain image data components 712-720 can be gated 722-730 in accordance with the corresponding indication generated by the corresponding neural network 702-710. In one implementation, the plurality of transformed domain image data components 712-720 can be gated 722-730 by multiplying the corresponding indication from the corresponding neural networks 702-710. If the indication is a '1,' the received transformed domain image data component 712, 718, 720 can be provided as in important transformed domain image data component 732, 738, 740. If the indication is a '0,' the received transformed domain image data component 714, 716 can be blocked 734, 736. The indication of the importance of the transformed domain image data components is not limited to values of '1' and '0'. In other instances, the indication can be a value between 0 and 1, wherein the higher the value the greater the importance of the transformed domain image data component.

Figure 8:
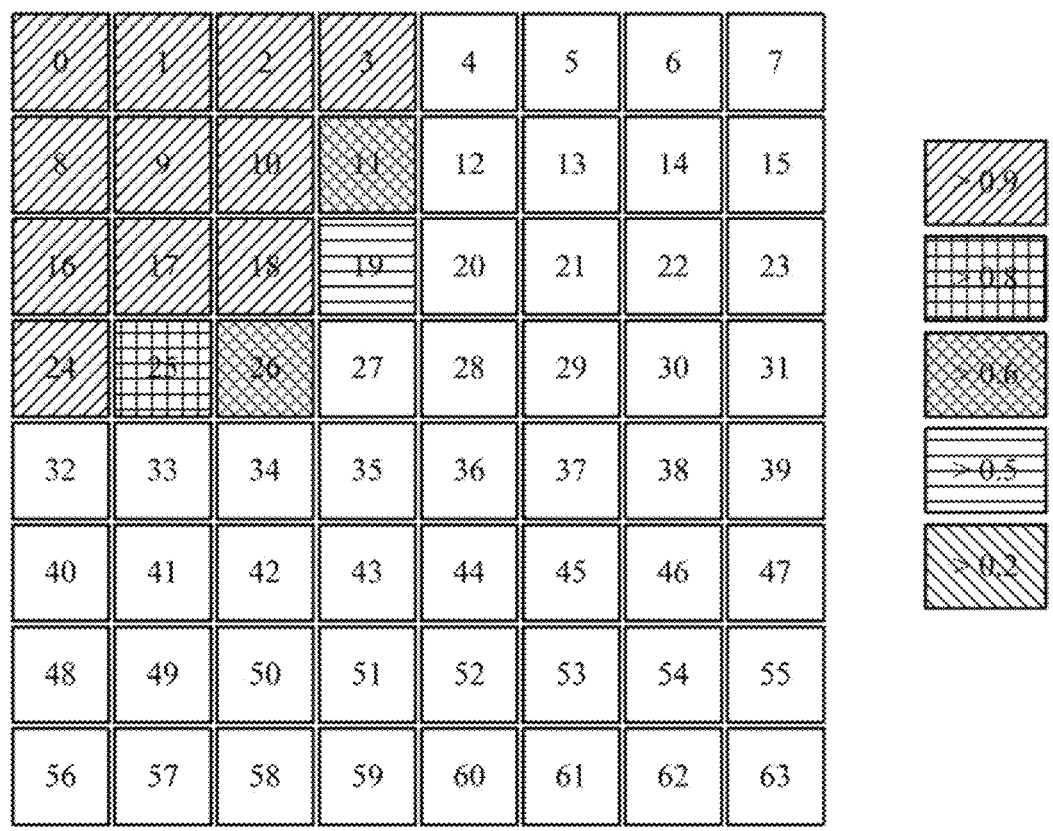
FIG. 8 illustrates exemplary components of the transformed domain image data, in accordance with aspects of the present technology.
Figure 8:
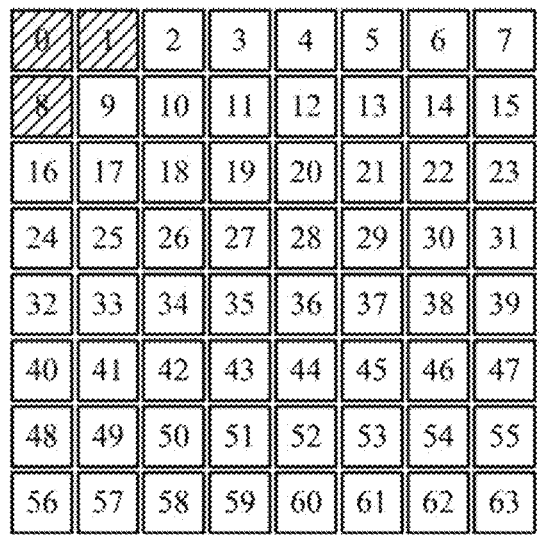
Figure 8:
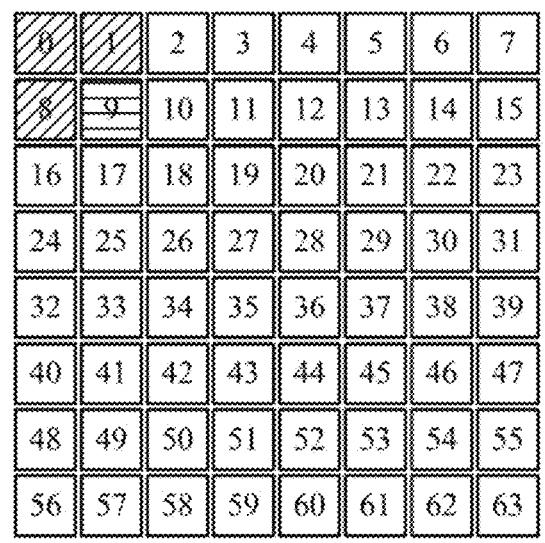

Referring now to FIG. 8, exemplary components of the transformed domain image data, in accordance with aspects of the present technology, are illustrated. The exemplary components of transformed domain image data may be based on the ImageNet dataset. ImageNet includes more than 14 million images in more than 20,000 categories that have been annotated to indicate what objects are pictured. The neural network used to determine the importance of the transformed domain image data components can be the MobileNet_v2, which is a convolution neural network that has been trained on more than a million images from the ImageNet dataset. The luma Y components of the discrete cosine transformed image data can include an 8×8 matrix of 64 channels. Similarly, the blue-difference chroma Cb components of discrete cosine transformed image data can include an 8×8 matrix of 64 channels, and the red-difference chroma Cr components of discrete cosine transformed image data can include an 8×8 matrix of 64 channels. A value of the relative importance of the transformed domain image data components can be assigned to each channel value. In the illustrated example, channels 0-3, 8-11, 16-19 and 24-26 in the discrete cosine transformed luma Y components can have importance values greater than '0.' Channels 0, 1 and 8 in the discrete cosine transformed blue-difference chroma, and channels 0, 1, 8 and 9 in the discrete cosine transformed red-difference chroma components can have importance values greater than '0."

Figure 9:
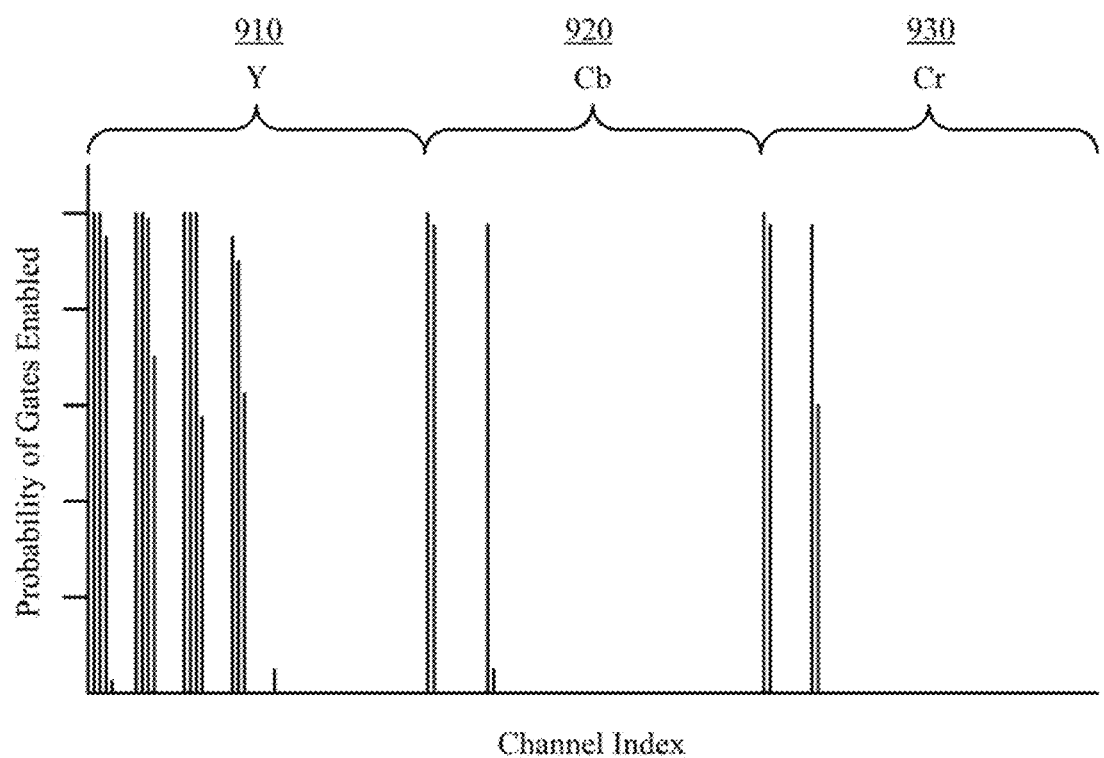
FIG. 9 illustrates relative importance of exemplary components of the transformed domain image data, in accordance with aspects of the present technology.

Referring now to FIG. 9, the relative importance of exemplary components of the transformed domain image data, in accordance with aspects of the present technology, are illustrated. The active channels, in the illustrated exemplary components of the discrete cosine transformed image data are mostly on luma Y channels 910, and partly on blue-difference chroma Cb channels 920, and red-difference chroma Cr channels 930. For the exemplary components of transformed domain image data based on the ImageNet dataset processed by the MobileNet_v2, using all 192 channels has been found to results in an accuracy of approximately 70%. In comparison, using 22 channels that are determined to be important can achieve an accuracy of approximately 69.3%. Accordingly, substantially similar accuracy can be achieved, while reducing the number of processed channels by 170.

Figure 10:
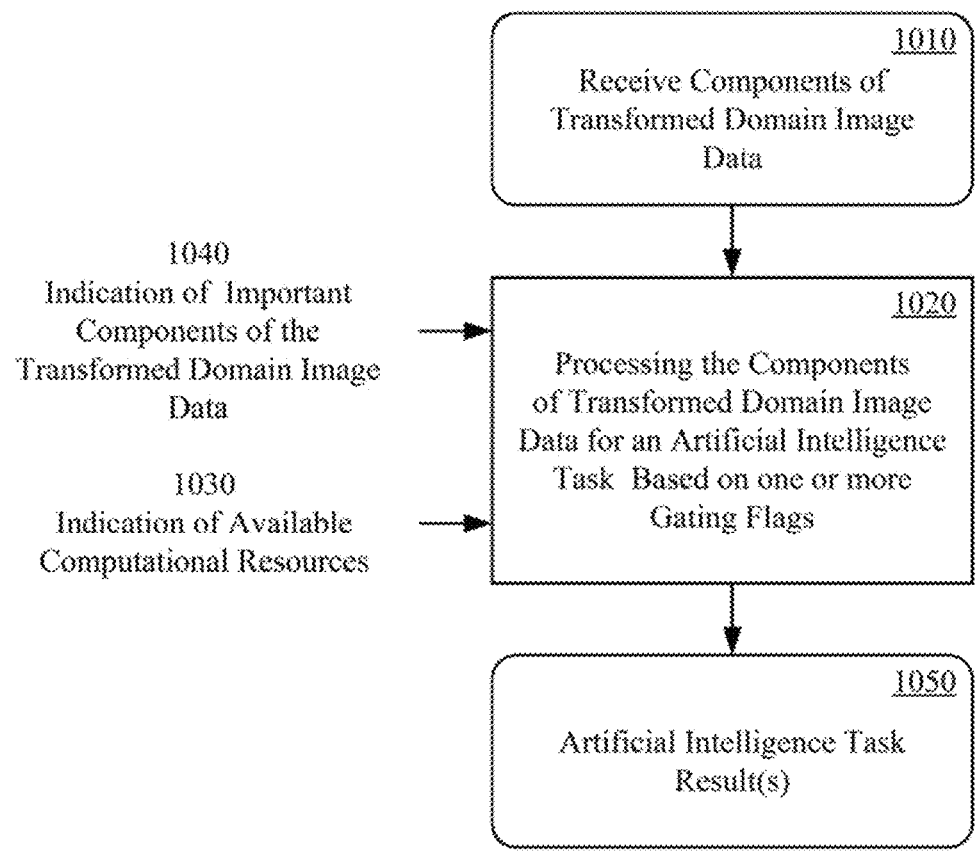
FIG. 10 shows a method of computing an artificial intelligence task, in accordance with aspects of the present technology.
Figure 11:
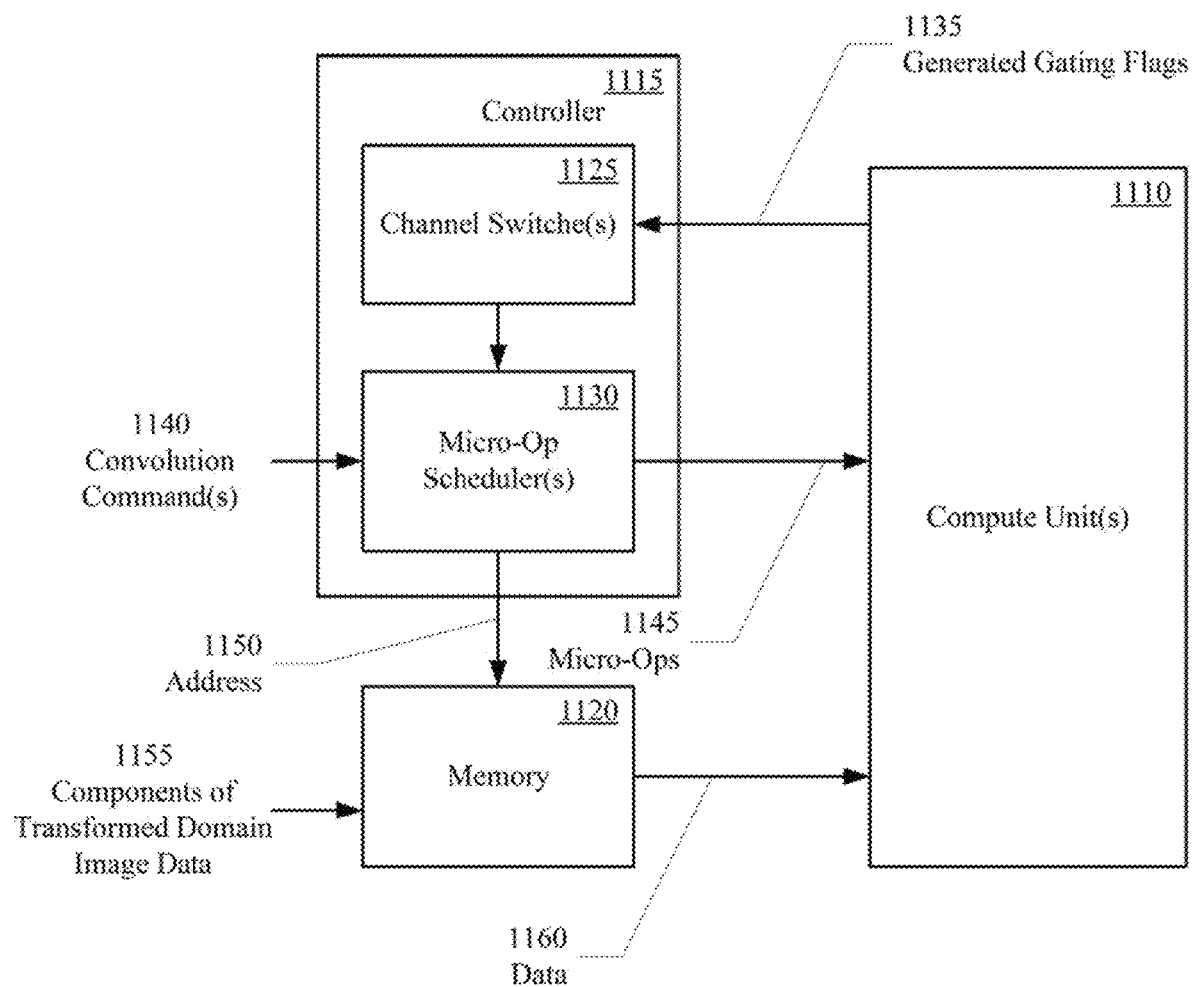
FIG. 11 shows a processor for computing the artificial intelligence task, in accordance with aspects of the present technology.

Referring now to FIG. 10, method of computing an artificial intelligence task, in accordance with aspects of the present technology, is shown. The method of computing an artificial intelligence task will be further explained with reference to FIG. 11, which shows a processor for computing the artificial intelligence task. In one implementation, the processor 1100 can be one or more central processing units (CPUs), one or more cores of one or more central processing units (CPUs), one or more graphics processing units (GPUs), one or more cores of one or more graphics processing units (GPUs), one or more artificial intelligence accelerators, one or more vector processors, one or more memory processing units, or the like, or combinations thereof. In one implementation, the processor 1100 can include one or more compute units 1110, one or more controllers 1115, and integral memory 1120. In other implementations, the memory 1120 can be external to the processor 1100.

The method can include receiving components of transformed domain image data, at 1010. The components of transformed domain image data can be received by the memory 1120 of the processor 1100. In one implementation, the components of transformed domain image data can be received from one or more image capture or storage units. In one implementation, the received components of transformed domain image data can be generated from native format image data as described above with reference to FIG. 2. In one implementation, the components of transformed domain image data can be one or more frames of Discrete Cosine Transform (DCT) YCbCr image data components. In other implementations, the component of transformed domain image data can be components of frequency domain image data, components of Fourier Transform (FT) image data, components of Wavelet Transform image data, components of Discrete Wavelet Transform (DWT) image data, components of Hadamard transform image data, or components of Walsh transform image data, or the like.

At 1020, an artificial intelligence task can be configured to process the components of the transformed domain image data based on one or more gating flags. In one implementation, the one or more gating flags can be arranged in a vector of bits indicating corresponding flag states or values. For example, the vector of bits can indicate one or more on components of the transformed domain image data and one or more off components of the transformed domain image data. The vector bits can be read to accelerate hardware by reading and or processing turned on components of the transformed domain image data and skipping turned off components. In one implementation, the one or more gating flags can be based on one or more indications of available computational resources 1030. For example, when the current utilization of the processor 1100 is relatively low (e.g., below a threshold) the one or more gating flags can be configured for processing a larger subset of the components of transformed domain image data by the processor 1100. When the current utilization of the processor 1100 is relatively high (e.g., above a threshold) the one or more gating flags can be configured to for processing a smaller subset of the components of transformed domain image data. In another implementation, the one or more gating flags can be based on one or more indications of the relative importance of the components of transformed domain image data 1040. For example, the gating flags can be configured for processing a subset of the transformed domain image data components determined to be important by the processor 1100 for the given artificial intelligence task. In yet another implementation, the one or more gating flags can be based on the one or more indications of the relative importance of the components of transformed domain image data 940 and the available computational resources 1030. For example, when the current utilization of the processor 1100 is relatively low (e.g., below a threshold), the one or more gating flags can be configured for processing a larger subset of the important transformed domain image data components. When the current utilization of the processor 1100 is relatively high (e.g., above a threshold), the one or more gating flags can be configured for processing a smaller subset of important transformed domain image data components. The one or more gating flags can be dynamically adjusted based on changes in the available computational resources and or the importance of components of the transformed image data. Furthermore, the gating flags are not limited to representing available computational resource and or the importance of the transformed image data components. The gating flags can also represent any number of other factors related to the processing of the components of transformed domain image data for an artificial intelligence task.

In one implementation, the controller 1115 can include one or more channel switches 1125 and one or more micro-operation scheduler 1130. The one or more channel switches 1125 can be configured to receive the one or more gating flags computed by one or more compute units 1110. The one or more micro-operation controllers 1130 can be configured to receive instructions 1140, such as convolution commands, and generate corresponding micro-operations 1145 for execution by the one or more compute units 1110 to perform functions, such as convolution operations, for performing one or more artificial intelligence tasks. The one or more micro-operations schedulers 1030 can also be configured to generate addresses 1150 for transferring data, such as components of transformed domain image data 1155, into the memory 1120. The one or more micro-operations scheduler 1130 can also be configured to generate addresses 1150 for transferring data, such as components of transformed domain image data 1155, for corresponding micro-operations to the one or more compute units 1110. The one or more channel switches 1125 can be configured to selectively control the generation of micro-operations 1145 and addresses 1150 by the one or more micro-op schedulers 1130 based on the one or more gating flags 1135 from the one or more compute units 1110. In one implementation, the one or more channel switches 1125 can cause the one or more micro-op scheduler 1130 to generate micro-operations 1145 to multiply the state of a corresponding gating flag with a corresponding transformed domain image data component. For example, if the corresponding gating flag is a '0' indicating that the component is not an important component and or there is not enough processing resources to utilize the component, the corresponding micro-operation 1145 can multiply the corresponding gating flag with the corresponding transformed domain image data component resulting in a corresponding transformed domain image data component of all zeros, making subsequent computations easier to perform. If the corresponding gating flag is a '1' indicating that the component is an important component and or there are enough processing resources, the corresponding transformed domain image data component is fed to subsequent computations unchanged. Alternatively, the one or more channel switches 1125 can cause the one or more micro-op schedulers 1130 to skip the generation of corresponding micro-operations 1145 and addresses 1150 when the corresponding gating flag is a "0" such that the one or more compute units 1110 do not have to perform operations with respect to the corresponding transformed domain image data component. After performing the received instructions 1140, such as the convolution commands of a given artificial intelligence task, the processor 1100 can output results of the artificial intelligence task, at 1050.

Accordingly, performing artificial intelligence tasks can be performed on a subset of transformed domain image data components based on one or more factors such as available computational resources, the importance of the components of the transformed domain image data, and the like. Artificial intelligence tasks can also be performed directly on the components of transformed domain image data, which can also advantageously reduce computational workload, data transmission bandwidth, processing latency, power consumption and or the like because the components of transformed domain image data does not need to be converted back to the native image data format before performing the artificial intelligence tasks. Performing artificial intelligence tasks only on a subset of the components of transformed domain image data found to be more important than other components of the transformed domain image data can also further reduce computational workload, data transmission bandwidth, processing latency, power consumption and or the like. Performing artificial intelligence tasks only on the subset of the components of transformed domain image data found to be more important than other components of the transformed domain image data has been found to achieve almost equal accuracy as compared to performing the artificial intelligence task on the native format image data.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
receiving components of transformed domain image data;
processing the components of transformed domain image data for an artificial intelligence task based on one or more gating flags, wherein the one or more gating flags are based on the combination of one or more indications of an importance of the components of transformed domain image data and one or more indications of computations resources available for processing the components of transformed domain image data for the artificial intelligence task; and
outputting results of the artificial intelligence task.

2. The method according to claim 1, wherein the one or more gating flags are based on one or more factors including availability of one or more computational resources for processing the components of the transformed domain image data for the artificial intelligence task.

3. The method according to claim 1, wherein the components of the transformed domain image data are used based on the one or more gating flags.

4. The method according to claim 1, further comprising:
wherein the one or more gating flags comprise a vector of bits indicating one or more on components of the transformed domain image data and one or more off components of the transformed domain image data; and
accelerating hardware using the vector of bits to determine the components of the transformed domain image data for processing by the artificial intelligence task on the hardware.

5. The method according to claim 1, wherein the components of transformed domain image data includes components of frequency domain image data, components of Fourier Transform (FT) image data, components of Discrete Cosine Transform (DCT) image data, components of Wavelet Transform image data, components of Discrete Wavelet Transform (DWT) image data, components of Hadamard transform image data, or components of Walsh transform image data.

6. The method according to claim 5, wherein the components of transformed domain image data comprises components of encoded YCbCr color space image data.

7. The method according to claim 5, wherein receiving components of transformed domain image data includes;
receiving RGB color space image data;
converting the RGB color space image data to YCbCr color space image data; and
encoding the YCbCr color space image data into components of Discrete Cosine Transform (DCT) YCbCr image data.

8. One or more computing device executable instructions stored on one or more non-transitory computing device readable media that when executed by one or more processors performs a method of:
receiving components of transformed domain image data;
gating the components of transformed domain image data for processing by an artificial intelligence task based on one or more gating flags, the one or more gating flags comprise a vector of bits indicating one or more on components of the transformed domain image data and one or more off components of the transformed domain image data, and accelerating hardware using the vector of bits to determine the components of the transformed domain image data for processing by the artificial intelligence task on the hardware; and
outputting results of the artificial intelligence task.

9. The one or more computing device executable instructions stored on one or more non-transitory computing device readable media that when executed by one or more compute units perform the method according to claim 8, further comprising determining the one or more gating flags based on one or more factors include a computational resource for processing by the artificial intelligence task.

10. The one or more computing device executable instructions stored on one or more non-transitory computing device readable media that when executed by one or more compute units perform the method according to claim 8, further comprising determining the one or more gating flags wherein important components of the transformed domain image data are more likely to be used than less important components of the transformed domain image data.

11. The one or more computing device executable instructions stored on one or more non-transitory computing device readable media that when executed by one or more compute units perform the method according to claim 8, wherein the one or more processors comprise one or more central processing units (CPUs), one or more cores of one or more central processing units (CPUs), one or more graphics processing units (GPUs), one or more cores of one or more graphics processing units (GPUs), one or more vector processors, or one or more memory processing units.

12. The one or more computing device executable instructions stored on one or more non-transitory computing device readable media that when executed by one or more compute units perform the method according to claim 8, wherein the one or more processors comprise:
one or more compute units configured to process components of transformed domain image data according to one or more micro-operations for an artificial intelligence task; and
one or more controllers including;
one or more micro-op schedulers; and
one or more channel switches configured to selectively control a transfer of the components of transformed domain image data to the one or more compute units based on one or more gating flags, and to selectively control generation of the one or more micro-operations by the one or more micro-op schedulers based on the one or more gating flags.

13. The one or more computing device executable instructions stored on one or more non-transitory computing device readable media that when executed by one or more compute unit performs the method according to claim 8, wherein the one or more gating flags are based on the combination of one or more indications of an importance of the components of transformed domain image data and available computations resources for processing the components of transformed domain image data for an artificial intelligence task.

14. A device comprising:
one or more compute units configured to process components of transformed domain image data according to one or more micro-operations for an artificial intelligence task; and one or more controllers including;
  one or more micro-op schedulers; and
  one or more channel switches configured to selectively control a transfer of the components of transformed domain image data to the one or more compute units based on one or more gating flags, and to selectively control generation of the one or more micro-operations by the one or more micro-op schedulers based on the one or more gating flags.

15. The device of claim 14, wherein the one or more gating flags are based on one or more indications of computations resources available for processing the components of transformed domain image data for the artificial intelligence task.

16. The device of claim 14, wherein the one or more gating flags are based on one or more indications of an importance of the components of transformed domain image data.

17. The device of claim 14, wherein the one or more gating flags are based on the combination of one or more indications of an importance of the components of transformed domain image data and one or more indications of computations resources available for processing the components of transformed domain image data for the artificial intelligence task.

18. The device of claim 14, wherein the components of transformed domain image data received by the one or more processor comprise one or more components of Discrete Cosine Transform (DCT) YCbCr image data.

* * * * *